May 14, 1946.   P. H. BATTEN   2,400,093
HYDRAULIC COUPLING
Filed Dec. 18, 1944   5 Sheets-Sheet 2

Inventor:
Percy H. Batten
By:
John M. Darley
Attorney

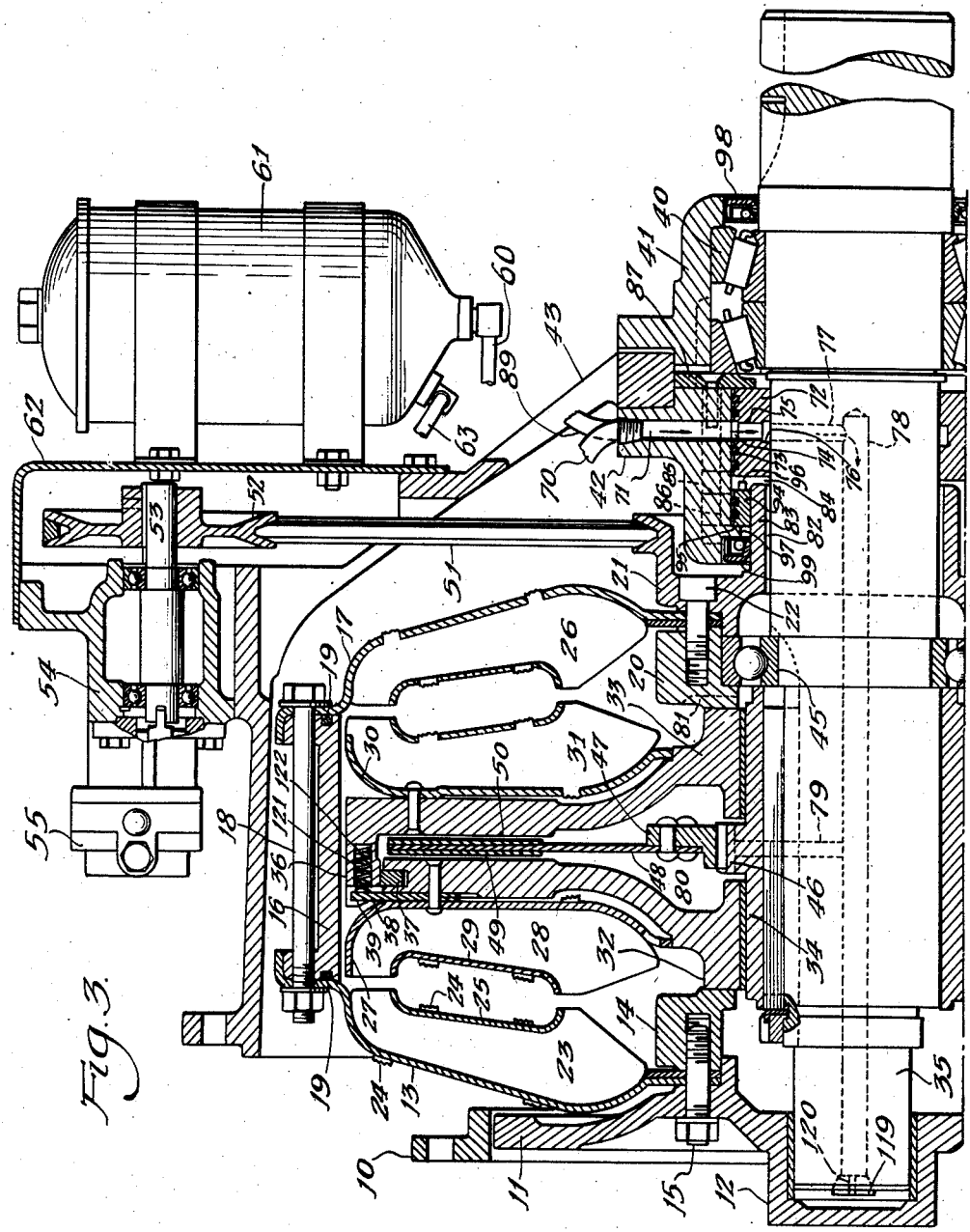

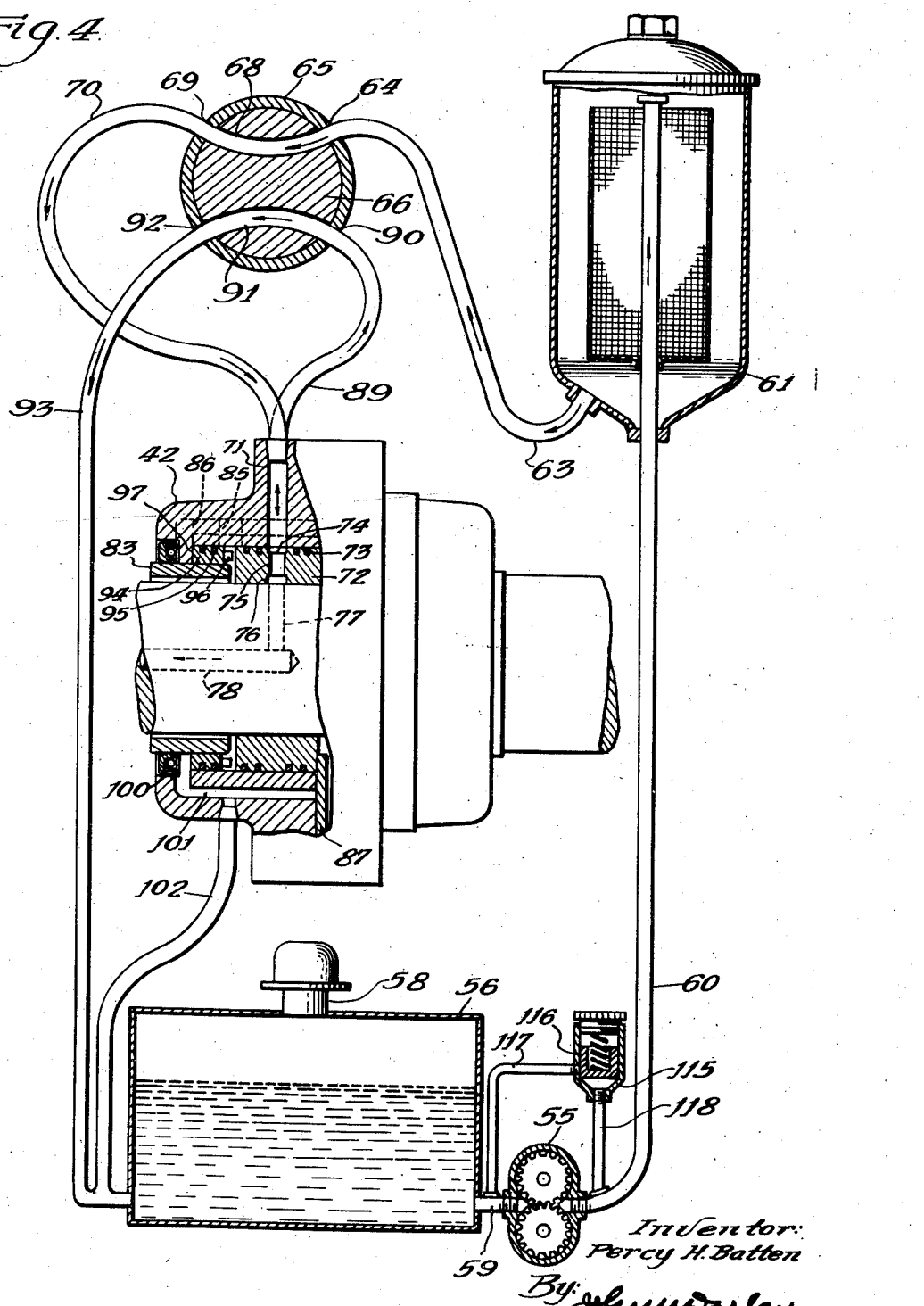

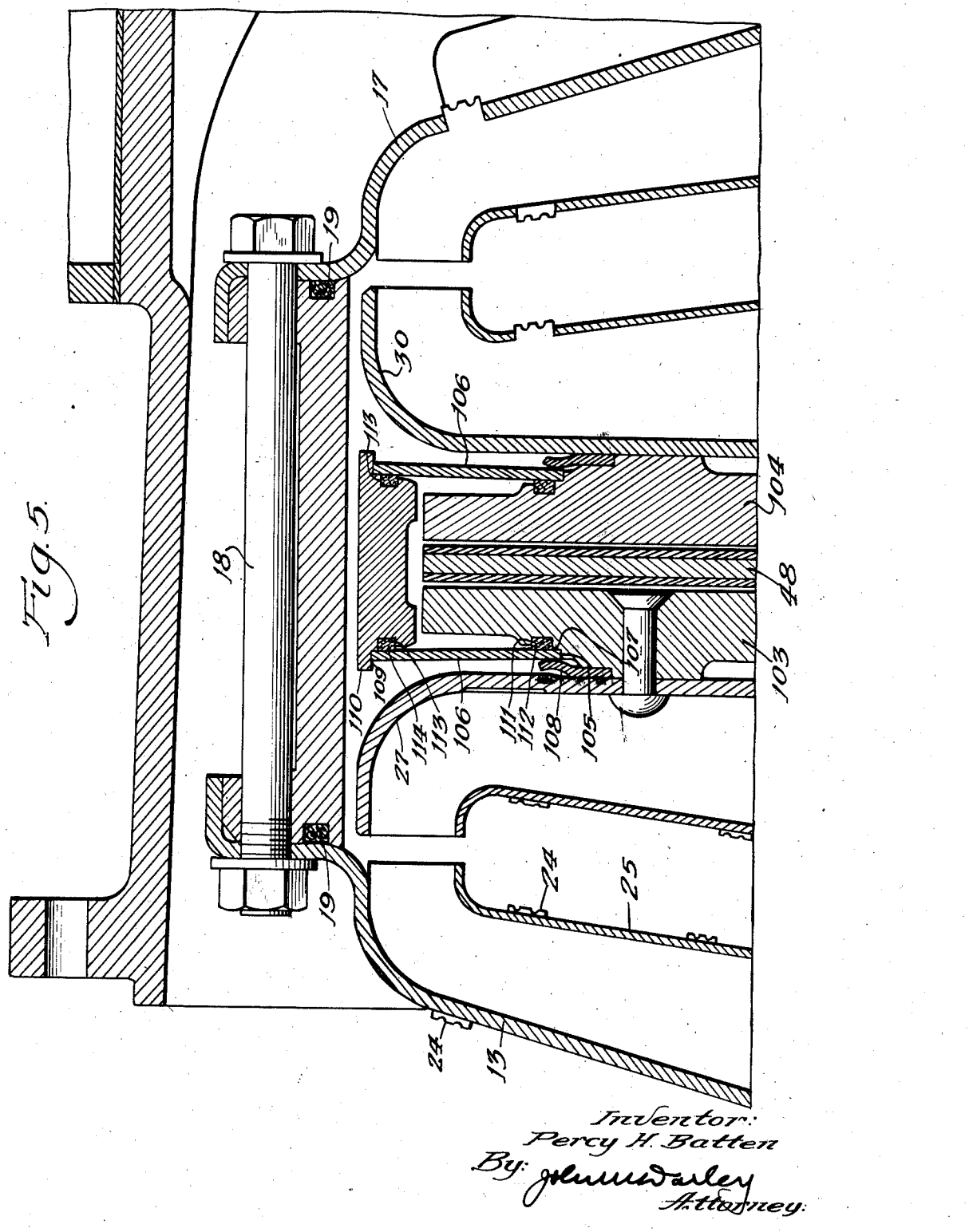

Patented May 14, 1946

2,400,093

UNITED STATES PATENT OFFICE 2,400,093

HYDRAULIC COUPLING

Percy H. Batten, Racine, Wis., assignor to Twin Disc Clutch Company, Racine, Wis., a corporation of Wisconsin Application December 18, 1944, Serial No. 568,640

20 Claims. (Cl. 192—3.2)

My invention relates to hydraulic couplings and more particularly to a mechanism of this type which incorporates a provision for preventing as desired the application of any torque to the driven shaft regardless of the speed of the engine or other power source.

One operating difficulty frequently encountered with the ordinary hydraulic coupling is the inability to positively interrupt power flow to the driven shaft as may be required by certain types of the connected machinery, for example, where there is a requirement for shifting gears in a transmission. Even at low speeds of the engine and hence of the coupling impeller, there exists a so-called drag torque which is reflected in a creeping of the runner shaft, or a tendency of this nature in the event that the load resistance exceeds this torque. The customary solution for this problem takes the form of an auxiliary friction clutch in the drive train externally of the coupling, and as a specifically different solution, there is disclosed in my United States Letters Patent No. 2,250,885, dated July 29, 1941, a coupling incorporating a friction clutch as an integral part thereof and which is mechanically engaged and disengaged.

One object of the present invention is to provide a hydraulic coupling having friction devices which are hydraulically engaged to positively transmit power and hydraulically disengaged to definitely interrupt power flow through the coupling.

A further object is to provide a coupling of the constantly filled type in which the engaging and disengaging forces for the friction devices are furnished by a suitable application of pressure to the coupling liquid.

These and further objects of the invention will be set forth in the following specification, reference being had to the accompanying drawings, and the novel means by which said objects are effectuated will be definitely pointed out in the claims.

In the drawings:

Fig. 3 is an enlarged, fragmentary, sectional elevation of the coupling as viewed in Fig. 1 and showing the coupling in a non-power transmitting condition.

Fig. 4 is a schematic layout of the piping and the several parts connected thereby which enable the friction clutch to be hydraulically engaged and disengaged, the relation of the parts being the same as that shown in Fig. 3.

Fig. 5 is an enlarged, fragmentary section showing a modified arrangement for effecting a seal around the pressure plates of the clutch which support the coupling runners.

Figure 1:
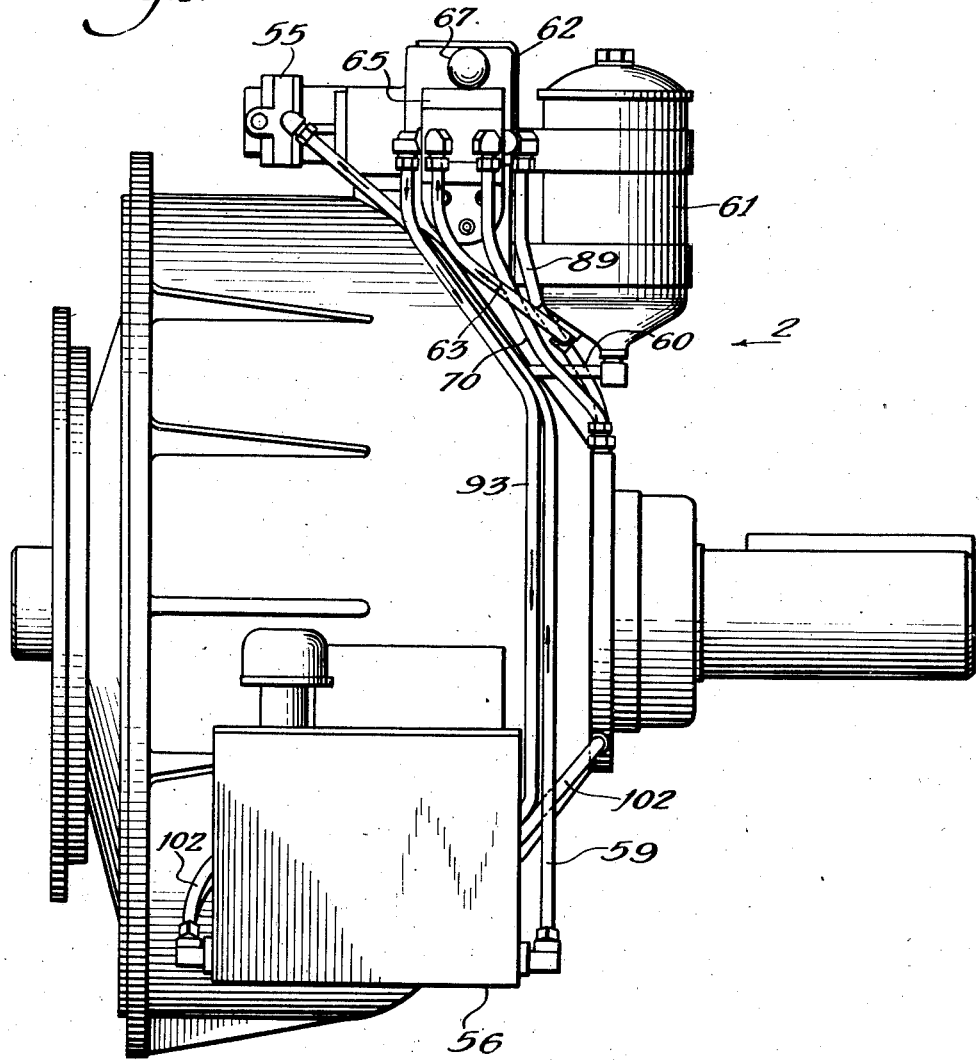
Figs. 1 and 2 are side and end elevations of the coupling, the latter view looking in the direction of the arrow 2 in Fig. 1, showing the pump, reserve tank, filter, control valve and connecting piping.

Referring to Fig. 3 of the drawings which shows the upper half of the improved construction, the numeral 10 designates an internally toothed, driving ring which may be bolted to an engine flywheel, or other source of power, and which meshes with an externally toothed, driven disk 11 having a hollow hub 12 that is coaxial with and preferably piloted in the flywheel. The inner rim of an impeller 13 is clamped by means of studs 15 between the disk 11 and a stop ring 14 located inwardly of the impeller and the outer rim is shaped to receive one end of a spacer ring 16 whose opposite end is received within the correspondingly shaped outer rim of an impeller 17 that is positioned in facing relation to the impeller 13. A plurality of circumferentially spaced bolts 18 which extend through the spacer ring 16 secure the impellers together and leakage of the working liquid, usually an appropriate oil, in this locality is prevented by packing 19—19 between the ends of the ring 16 and the adjacent portions of the impeller rims. The inner rim of the impeller 17 is clamped between a stop ring 20 located inwardly of the impeller and a pulley 21 by means of a plurality of cap screws 22. The impeller 13 is provided with a plurality of radial blades 23 each of which is fixed in position by ears 24 that extend through the impeller and a shroud ring 25 and are riveted over, thus defining a plurality of radial liquid passages. Similarly positioned and secured blades 26 are arranged around the impeller 17 to form like liquid passages.

A runner 27 having a plurality of radial blades 28 defining therewith and a shroud ring 29 a plurality of radial, liquid passages is located in facing and cooperating relation to the impeller 13 and a similar runner 30 having blades 31 and like radial, liquid passages is positioned in facing and cooperating relation to the impeller 17, thus forming a pair of turbine transmission circuits. From the foregoing, it will be understood that the runners 27 and 30 constitute the inner shells of their respective liquid circuits, while the outer shells are formed by the impellers 13 and 17. However, power flow through the coupling may be reversed without affecting its operability and, in this event, the runners 27 and 30 act as impellers and the impellers 13 and 17 serve as runners.

The runners 27 and 30 are respectively carried by pressure plates 32 and 33 which are freely journaled on a hub 34 keyed to a driven shaft 35. An annular flange 36 is provided on the periphery of the plate 33 which overlies the periphery of the plate 32 and a piston ring 37 seated in a groove in the plate 32 provides sealing contact with the inner surface of the flange 36 so that the space between the plates 32 and 33 is substantially oil tight and pressure may be established therein for a purpose presently explained. As a means of insuring that the plates 32 and 33 and the associated runners will rotate together to thus maintain the effectiveness of the piston ring seal, a plurality of spaced fingers 38 are clamped between the runner 27 and plate 32, only one being shown in Fig. 3, and the outer end of each finger is received within a slot 39 in the flange 36.

Figure 2:
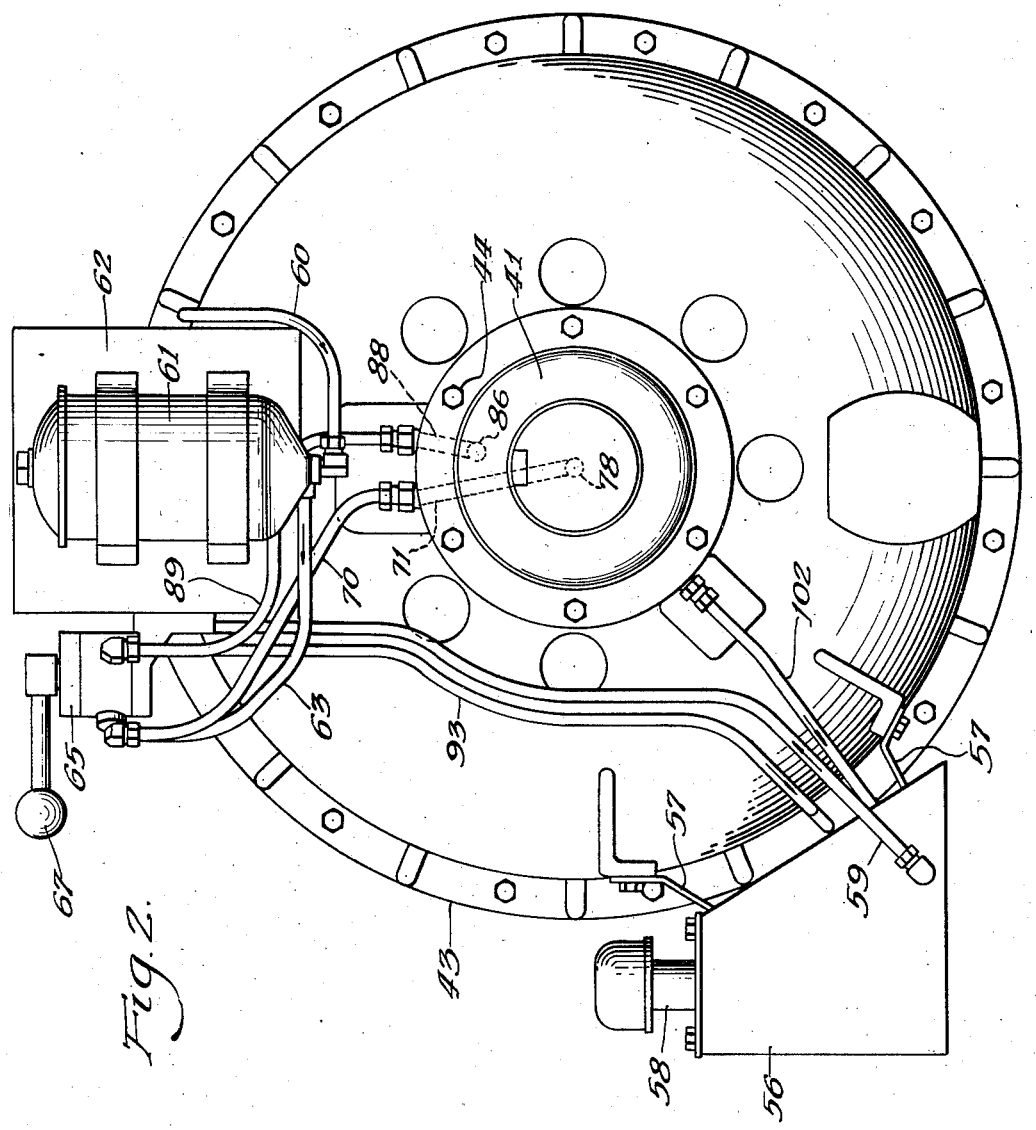

One end of the shaft 35 is piloted in the hub 12 and the opposite end is journaled in a bearing 40 carried by a ring 41, between which and a ring 42 is secured the inner periphery of a housing 43 by bolts 44 (see Figs. 2 and 3). The rings 41 and 42 substantially constitute a hub in which the shaft 35 is journaled. The housing 43 encloses the coupling and may be attached to the engine flywheel housing or otherwise supported. An intermediate bearing 45 is carried by the shaft 35 and its outer race is in supporting relation to the stop ring 20.

Since the pressure plates 32 and 33 and their associated runners are freely journaled on the driven shaft 35, it is necessary to provide a releasable mechanical connection between the plates 32 and 33 and the shaft such that the power connection through the coupling to the shaft can be positively completed or broken and, when interrupted, torque will not be exerted on the shaft.

For this purpose, the hub 34 incorporates an annular, toothed flange 46 centrally disposed between the pressure plates 32 and 33 which meshes with a toothed ring 47 having attached thereto a clutch plate 48. This plate is located between the plates 32 and 33 and has secured to its opposite surfaces the usual friction facings which are disposed in coacting relation to annular faces 49 and 50 provided, respectively, on the pressure plates 32 and 33. Hence, when these plates are shifted towards each other as presently explained, the plate 48 is gripped between the pressure plates to establish a final, friction clutch connection with the shaft 35. Generally speaking, the pressure plates 32 and 33 are hydraulically moved towards and away from each other to establish and break the power connection, respectively, by suitably applying a pressure to the liquid of the coupling.

The pulley 21 is drivably connected by a belt 51 with a pulley 52 that is secured to one end of a shaft 53 journaled in a bracket 54 carried by the housing 43. The other end of the shaft 53 is drivably connected to an oil pump 55 that may be of the characteristic spur gear type as shown in Fig. 4. Since the pump is thus positively connected to the impellers 16 and 17, it is capable of delivering pressure whenever the impellers rotate and, during periods of power transmission, this pressure is transmitted to the liquid circuits of the coupling to thus shift the plates 32 and 33 to positions in which they grip the clutch plate 48, and when it is desired to interrupt the power flow, the pump pressure is shifted to the annular space between the plates 32 and 33 to thus separate them from contact with the clutch plate 48, the latter position being shown in Fig. 3. The coupling is always filled with oil during operation and the pressure shifts are accomplished by an external system of control which will now be described.

A reserve oil tank 56 (see Figs. 1 and 2) is attached to the lower portion of the housing 43 by hangers 57 and is provided with a breather pipe 58 whereby the oil in the tank is always subjected to atmospheric pressure. A suction line 59 leads from the tank to the pump 55 (see Figs. 1, 2 and 4) whose discharge is conducted through a line 60 to the interior of a filter 61 supported by a shield 62 carried by the bracket 54. In order to prevent the building up of excessive pressures in the unit, the pump 55 is preferably associated with a pressure relief valve 115 of standard construction having a spring actuated valve plunger 116. The valve is connected to the lines 59 and 60 by lines 117 and 118, respectively, whereby when the pressure in the line 60 exceeds a predetermined value, the plunger 116 is shifted to bypass a portion or all of the oil through the lines 118 and 117. The discharge of the filter is connected by a line 63 with a port 64 provided in the casing of a four-way valve 65 having a rotor 66 controlled by a handle 67, the valve also being carried by the bracket 54. The rotor 66 is provided with a passage 68 which connects the port 64 with a port 69 in the valve casing when the rotor occupies the position shown in Fig. 4. A line 70 connects the port 69 with a radial passage 71 formed in the ring 42. As indicated in Figs. 3 and 4, the ring 42 is spaced from the shaft 35 and this space on both sides of the inner end of the passage 71 is occupied by a carrier ring 72 which fits the shaft 35 and whose outer surface on both sides of the passage is grooved to receive a plurality of piston rings 73 which have sealing contact with the inner surface of the ring 42. The inner end of the passage 71 communicates with an annular channel 74 in the outer surface of the carrier ring 72 and this channel connects through a radial passage 75 with an annular channel 76 that always communicates with a radial passage 77 that extends part way through the shaft 35. The inner end of the passage 77 connects with an axial passage 78 in and which extends towards and terminates at the left end of the shaft, as viewed in Fig. 3. One purpose of the passage 78 is to provide lubrication for the pilot bearing of the shaft 35 in the hub 12. Preferably, the left end of the passage 78 is closed by a plug 119 having a bleed hole 120 to control the flow of oil to the pilot bearing. A radial passage 79 which extends through the hub 34, flange 46 and part way through the shaft 35 connects the passage 78 with the space 80 between the pressure plates 32 and 33 on both sides of the clutch plate 48.

It will therefore be understood that when the valve rotor 66 occupies the position shown in Fig. 4, the pressure of the pump 55 is applied directly to the space 80, thus maintaining the pressure plates 32 and 33 in the disengaged position shown. The separating movements of the plates are limited by the stop rings 64 and 20.

During the above period of operation, the working circuits of the coupling are filled with oil, but this oil is not under pressure. These circuits then communicate through slots 81 in the stop ring 20 and through the bearing 45 with an annular passage 82 formed between the shaft 35 and a sleeve 83 spaced therefrom and constituting a part of the pulley 21. The right end of the sleeve 83, as viewed in Fig. 3, is spaced from the adjacent end of the carrier ring 72 to thus form an annular passage 84 that is always in communication with a radial passage 85 which extends part way through the ring 42 for connection with a passage 86 also disposed within the ring 42 in parallel relation to the axis of the shaft 35. The passage 86 may be drilled from the right end of and part way through the ring 42 to intersect the passage 85 and the right end of the former passage may then be closed by an annulus 87 interposed between the end of the ring and the bearing 40 and secured to the ring.

As indicated in Fig. 2, the passage 86 is spaced circumferentially from the radial passage 71 and the former communicates by way of a radial passage 88 with a line 89 that connects with a port 90 (see Fig. 4) in the casing of the valve 65. The valve rotor 66 is provided with a second passage 91 which, in the positions of the parts shown in Figs. 3 and 4, connects the port 90 with a port 92 also in the valve casing and the latter port is connected to the tank 56 by a line 93. Hence, when the pressure plates 32 and 33 occupy the positions shown in Fig. 3, the liquid circuits of the coupling are not subjected to any pressure since they then communicate with the tank 56 whose position is such that it is incapable of exercising any pressure on the liquid in the circuits, while the other portions of the liquid system are subjected to the relatively higher pressure established by the pump 55.

To engage the friction elements of the coupling and establish power flow through the coupling, the valve rotor 66 is rocked clockwise as viewed in Fig. 4 to a position in which the passage 68 connects the ports 64 and 90 and the passage 91 connects the ports 69 and 92. Pump pressure is then effective in the line 89 and the connecting passages above referred to and hence in the liquid circuits of the coupling, while the pressure in the space 80 drops to zero since it then communicates with the tank 56. Accordingly, the pressure plates 32 and 33 are shifted towards each other to drivingly grip the clutch plate 48.

It may be desirable to provide an added separating factor for the pressure plates of the coupling. For example, where the coupling is out of service for such a length of time that the oil cools and contracts, the coupling is then not completely filled. Hence, when the coupling is again placed in operation, there will be a period when the pump 55 is filling the coupling and, during this time, the pressure within the unit is of a low magnitude. As the engine accelerates, the inherent hydraulic thrusts of the coupling circuits may tend to or may actually engage the clutch at a time when power is not desired in the driven machinery. If this situation does arise, it may be remedied by providing a plurality of circumferentially spaced sockets 121 (see Fig. 3) in the flange 36 registering with the fingers 38 and mounting in each of the sockets a helical spring 122 which seats on the base of the associated socket and exerts pressure against the adjacent finger for the purpose of positively disengaging the pressure plates 32 and 33. These springs may also be necessary where the coupling is emptied when not in use.

In addition to the carrier ring 72 and its associated piston ring seals 73, leakage control is exercised by a second carrier ring 94 which externally fits the sleeve 83 to the left of the passage 84, as viewed in Fig. 3, and which is provided with a plurality of piston rings 95 which have sealing contact with the adjacent, inner surface of the ring 42. The ring 94 includes one or more projections 96 extending laterally from the right end thereof into the passage 84 to prevent closing of this passage by an inadvertent shifting of the carrier rings 72 and 94, the opposite end of the ring 94 abutting a shoulder 97 provided on the ring 42. Any oil that may leak past the piston ring seals is retained within the unit by standard type shaft seals 98 and 99 interposed, respectively, between the shaft 35 and the outer end of the ring 41, and between the sleeve 83 and the ring 42 beyond the shoulder 97, and is collected in passages 100 and 101 (see Fig. 4) for return by gravity through the line 102 to the tank 56.

It will be understood that the pump 55 possesses sufficient capacity to compensate for any leakage past the journal bearings of the pressure plates 32 and 33 and also past the piston ring seal 37 between the pressure plates so that adequate pressure is always available to shift these plates into and out of engaging positions.

In Fig. 5 is illustrated a modified arrangement for sealing the space between the pressure plates, like parts being identified by the same numerals as heretofore. The clutch plate 48 is positioned between pressure plates 103 and 104 which are secured as in Fig. 3 to runners 27 and 30, respectively. Each plate is provided on its outer face with an annular shoulder 105 on which is seated the inner, edge face of a flat ring 106 whose thickness is such that it is capable of a slight rocking movement on the shoulder and which abuts a limited portion 107 of the adjacent face of the plate. The ring 106 is retained in the latter position by the pressure of a plurality of spring fingers 108 clamped between the pressure plate and runner. The outer, edge face of the ring 106 seats against a shoulder 109 formed on a connector ring 110 that is common to both rings 106. The plates 103 and 104 are annularly recessed as at 111 adjacent the inner portions of the rings 106 to receive packing 112 and the connector ring 110 is similarly recessed on its opposite faces as at 113 to receive packing 114. The packing 112 and 114 provide the required liquid tight seal between the working circuits of the coupling and the space between the pressure plates 103 and 104 necessary to enable the latter to be shifted to engaging and disengaging positions by the pump pressure as hereinbefore described. During these movements of the pressure plates, the rings 106 accommodate themselves to the plates while maintaining sealing contact with the packing 112 and 114.

In the event that mechanical holding of the pressure plates 103 and 104 out of clutching position is desired during filling of the coupling as outlined in connection with the coupling shown in Fig. 3, the rings 106 may provide the disengaging force. They may be set in place with some tension so that they tend to hold the plates 103 and 104 in disengaged position.

I claim:

1. In a hydraulic coupling, the combination of an impeller, a shaft coaxial with the impeller, a member freely journaled on the shaft, one side of the member being arranged for runner cooperation with the impeller to form a liquid turbine transmission circuit and the opposite side having a friction face and the member constituting an axially shiftable wall of a chamber separate from the circuit, a clutch plate drivably connected to the shaft, a pump, and means selectively operable to direct the pump pressure to the circuit to engage the member with the plate and to the chamber to disengage the member.

2. In a hydraulic coupling, the combination of a pair of members cooperatively related to form a liquid turbine transmission circuit, a shaft coaxial with the members, one of the members being freely journaled on the shaft and constituting an axially shiftable wall of a chamber separate from the circuit, clutch means secured to the shaft, a pump, and means selectively operable to direct the pump pressure to the circuit to engage the freely journaled member with the clutch means and to the chamber to disengage the last named member.

3. In a hydraulic coupling, the combination of a pair of members cooperatively related to form a liquid turbine transmission circuit, a shaft coaxial with the members, one of the members being freely journaled on the shaft and constituting an axially shiftable wall of a chamber separate from the circuit, clutch means secured to the shaft, a pump, means selectively operable to direct the pump pressure to the circuit to engage the freely journaled member with the clutch means and to the chamber to disengage the last named member, and means carried by one of the members for limiting the disengaging movement of the freely journaled member.

4. In a hydraulic coupling, the combination of a pair of shells cooperatively related to form a liquid turbine transmission circuit, a shaft coaxial with the shells, a pressure plate carrying one of the shells freely journaled on the shaft and forming an axially shiftable wall of a chamber separate from the circuit, a clutch plate drivably connected to the shaft, a pump, and means selectively operable to direct the pump pressure to the circuit to engage the pressure and clutch plates and to the chamber to disengage the pressure plate.

5. A hydraulic coupling comprising a pair of axially spaced and connected impellers located in facing relation, a shaft coaxial with the impellers, a pair of axially shiftable runners freely journaled on the shaft and forming with the impellers a pair of liquid working circuits, the runners enclosing a chamber separate from the circuits, clutch means secured to the shaft within the chamber, a pump, and means selectively operable to direct the pump pressure to the circuits to engage the runners with the clutch means and to the chamber to disengage the runners.

6. A hydraulic coupling comprising a pair of axially spaced and connected impellers located in facing relation, a shaft coaxial with the impellers, a pair of axially shiftable runners freely journaled on the shaft and forming with the impellers a pair of liquid working circuits, the runners enclosing a chamber separate from the circuits and each runner having an annular friction face exposed within the chamber, a friction clutch plate drivably connected to the shaft, a pump, and means selectively operable to direct the pump pressure to the circuits to engage the runners with the clutch plate and to the chamber to disengage the runners.

7. A hydraulic coupling comprising a pair of axially spaced and connected impellers located in facing relation, a shaft coaxial with the impellers, a pair of runners forming with the impellers a pair of liquid working circuits, an axially shiftable pressure plate supporting each runner and freely journaled on the shaft, the plates constituting movable walls of a chamber separate from the circuits, a clutch plate drivably secured to the shaft within the chamber, a pump, and means selectively operable to direct the pump pressure to the circuits to engage the pressure and clutch plates and to the chamber to disengage the pressure plates.

8. A hydraulic coupling comprising a pair of axially aligned, liquid turbine transmission circuits, each composed of an inner and an outer shell, a shaft coaxial with the shells, the inner pair of shells being axially shiftable, freely journaled on the shaft and enclosing a chamber separate from the circuits, clutch means secured to the shaft within the chamber, a pump, and means selectively operable to direct the pump pressure to the circuits to engage the inner shells with the clutch means and to the chamber to disengage the inner shells.

9. A hydraulic coupling comprising a pair of axially spaced and connected impellers located in facing relation, a shaft coaxial with the impellers, a pair of runners freely journaled on the shaft and forming with the impellers a pair of liquid working circuits, the runners being relatively movable in axial directions and enclosing a chamber separate from the circuits, axially shiftable clutch means secured to the shaft within the chamber, a pump, and means selectively operable to direct the pump pressure to the circuits to engage the runners with the clutch means and to the chamber to disengage the runners.

10. A hydraulic coupling comprising a pair of axially aligned, liquid turbine transmission circuits, each composed of an inner and an outer shell, a shaft coaxial with the shells, the inner pair of shells being relatively movable in axial directions, freely journaled on the shaft and enclosing a chamber separate from the circuits, axially shiftable clutch means secured to the shaft within the chamber, a pump, and means selectively operable to direct the pump pressure to the circuits to engage the inner shells with the clutch means and to the chamber to disengage the inner shells.

11. A hydraulic coupling comprising a pair of axially spaced and connected impellers located in facing relation, a shaft coaxial with the impellers, a pair of runners freely journaled on the shaft and forming with the impellers a pair of liquid working circuits, the runners enclosing a chamber and being relatively movable in axial directions, means connecting the runners for rotation together, piston ring means carried by one of the runners providing a liquid tight seal between the runners whereby the chamber is separate from the circuits, axially shiftable clutch means secured to the shaft within the chamber, a pump, and means selectively operable to direct the pump pressure to the circuits to engage the runners with the clutch means and to the chamber to disengage the runners.

12. A hydraulic coupling comprising a pair of axially spaced and connected impellers located in facing relation, a shaft coaxial with the impellers, a pair of axially shiftable runners freely journaled on the shaft and forming with the impellers a pair of liquid working circuits, the runners enclosing a chamber, means connecting the runners for rotation together, piston ring means carried by one of the runners providing a liquid tight seal between the runners whereby the chamber is separate from the circuits, clutch means secured to the shaft within the chamber, a pump, and means selectively operable to direct the pump pressure to the circuits to engage the runners with the clutch means and with the chamber to disengage the runners.

13. A hydraulic coupling comprising a pair of axially spaced and connected impellers located in facing relation, a shaft coaxial with the impellers, a pair of runners forming with the impellers a pair of liquid working circuits, an axially shiftable pressure plate supporting each runner and freely journaled on the shaft, the plates constituting movable walls of a chamber, means connecting the plates for rotation together, piston ring means carried by one of the plates providing a liquid tight seal between the plates whereby the chamber is separate from the circuits, a clutch plate drivably secured to the shaft within the chamber, a pump, and means selectively operable to direct the pump pressure to the circuits to engage the pressure and clutch plates and to the chamber to disengage the pressure plates.

14. A hydraulic coupling comprising a pair of axially spaced and connected impellers located in facing relation a shaft coaxial with the impellers a pair of axially shiftable runners freely journaled on the shaft and forming with the impellers a pair of liquid working circuits the runners enclosing a chamber separate from the circuits, clutch means secured to the shaft within the chamber, a hub in which the shaft is journaled, a pump, passage means in the shaft and hub adapted to connect the pump to the chamber and other passage means in the hub adapted to connect the pump with the circuits, and means selectively operable to direct the pump pressure to the circuits to engage the runners with the clutch means and with the chamber to disengage the runners.

15. In a hydraulic coupling of the constantly filled type the combination of an impeller, a shaft coaxial with the impeller, a member freely journaled on the shaft, one side of the member being arranged for runner cooperation with the impeller to form a liquid turbine transmission circuit and the opposite side having a friction face and the member constituting an axially shiftable wall of a chamber separate from the circuit a clutch plate drivably connected to the shaft, a tank containing working liquid at atmospheric pressure, a pump between the tank and coupling, and means selectively operable to direct the pump pressure to the circuit to engage the member with the plate and connect the chamber with the tank, and to direct the pump pressure to the chamber to disengage the member and to connect the circuit with the tank.

16. A hydraulic coupling comprising a pair of axially spaced and connected impellers located in facing relation, a shaft coaxial with the impellers, a pair of runners forming with the impellers a pair of liquid working circuits, an axially shiftable pressure plate supporting each runner and freely journaled on the shaft, the plates constituting movable walls of a chamber, a connector ring surrounding the peripheries of the plates in spaced relation thereto, a diaphragm ring extending between each end of the connector ring and the adjacent plate, sealing means between the connector and diaphragm rings and between the plates and the diaphragm rings whereby the chamber is separate from the circuits, a clutch plate drivably secured to the shaft within the chamber, a pump, and means selectively operable to direct the pump pressure to the circuits to engage the pressure and clutch plates and to the chamber to disengage the pressure plates.

17. In a hydraulic coupling, the combination of an impeller, a shaft coaxial with the impeller, a member freely journaled on the shaft, one side of the member being arranged for runner cooperation with the impeller to form a liquid turbine transmission circuit and the opposite side having a friction face and the member constituting an axially shiftable wall of a chamber separate from the circuit, a clutch plate drivably connected to the shaft, a pump, means selectively operable to direct the pump pressure to the circuit to engage the member with the plate and to the chamber to disengage the member, and spring means interposed between the member and another wall of the chamber always tending to shift the member to a disengaged position.

18. A hydraulic coupling comprising a pair of axially spaced and connected impellers located in facing relation, a shaft coaxial with the impellers, a pair of axially shiftable runners freely journaled on the shaft and forming with the impellers a pair of liquid working circuits, the runners enclosing a chamber separate from the circuits, clutch means secured to the shaft within the chamber, a pump, means selectively operable to direct the pump pressure to the circuits to engage the runners with the clutch means and to the chamber to disengage the runners, and spring means interposed between the runners always tending to shift the runners to disengaged positions.

19. A hydraulic coupling comprising a pair of axially spaced and connected impellers located in facing relation, a shaft coaxial with the impellers, a pair of runners freely journaled on the shaft and forming with the impellers a pair of liquid working circuits, the runners enclosing a chamber and being relatively movable in axial directions, means connecting the runners for rotation together comprising fingers carried by one runner extending into slots formed in the other runner, axially shiftable clutch means secured to the shaft within the chamber, a pump, means selectively operable to direct the pump pressure to the circuits to engage the runners with the clutch means and to the chamber to disengage the runners, and spring means interposed between the runners and abutting the fingers always tending to shift the runners to disengaged positions.

20. A hydraulic coupling comprising a pair of axially spaced and connected impellers located in facing relation, a shaft coaxial with the impellers, a pair of runners forming with the impellers a pair of liquid working circuits, an axially shiftable pressure plate supporting each runner and freely journaled on the shaft, the plates constituting movable walls of a chamber, a connector ring surrounding the peripheries of the plates in spaced relation thereto, a diaphragm ring extending between each end of the connector ring and the adjacent plate, sealing means between the connector and diaphragm rings and between the plates and the diaphragm rings whereby the chamber is separate from the circuits, a clutch plate drivably secured to the shaft within the chamber, a pump, and means selectively operable to direct the pump pressure to the circuits to engage the pressure and clutch plates and to the chamber to disengage the pressure plates, the diaphragm rings being characterized by sufficient tension to always tend to shift the pressure plates to disengaged positions.

PERCY H. BATTEN.